March 26, 1963  E. D. MYERS  3,082,833
TAKE-DOWN WEIGHING SCALE WITH PART STORAGE FACILITIES
Filed Dec. 19, 1960  2 Sheets-Sheet 1
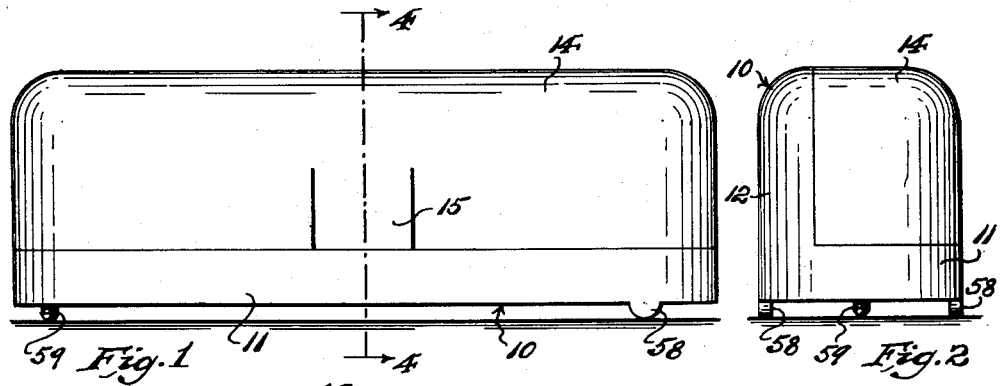
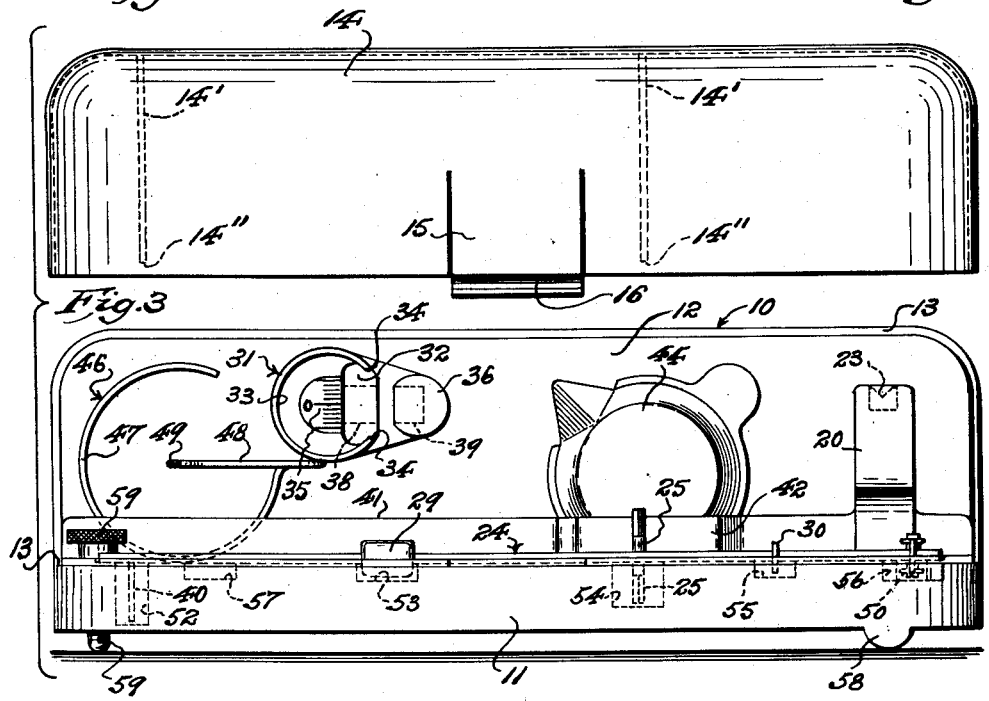
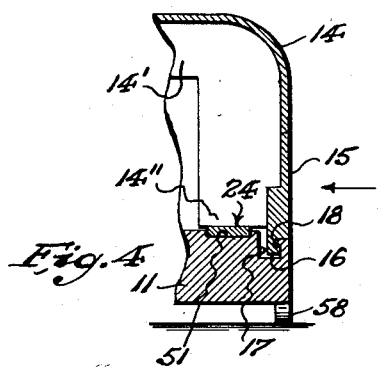
INVENTOR.
Earl D. Myers
BY Richards & Cifelli,
Attorneys March 26, 1963 E. D. MYERS 3,082,833
TAKE-DOWN WEIGHING SCALE WITH PART STORAGE FACILITIES
Filed Dec. 19, 1960 2 Sheets-Sheet 2
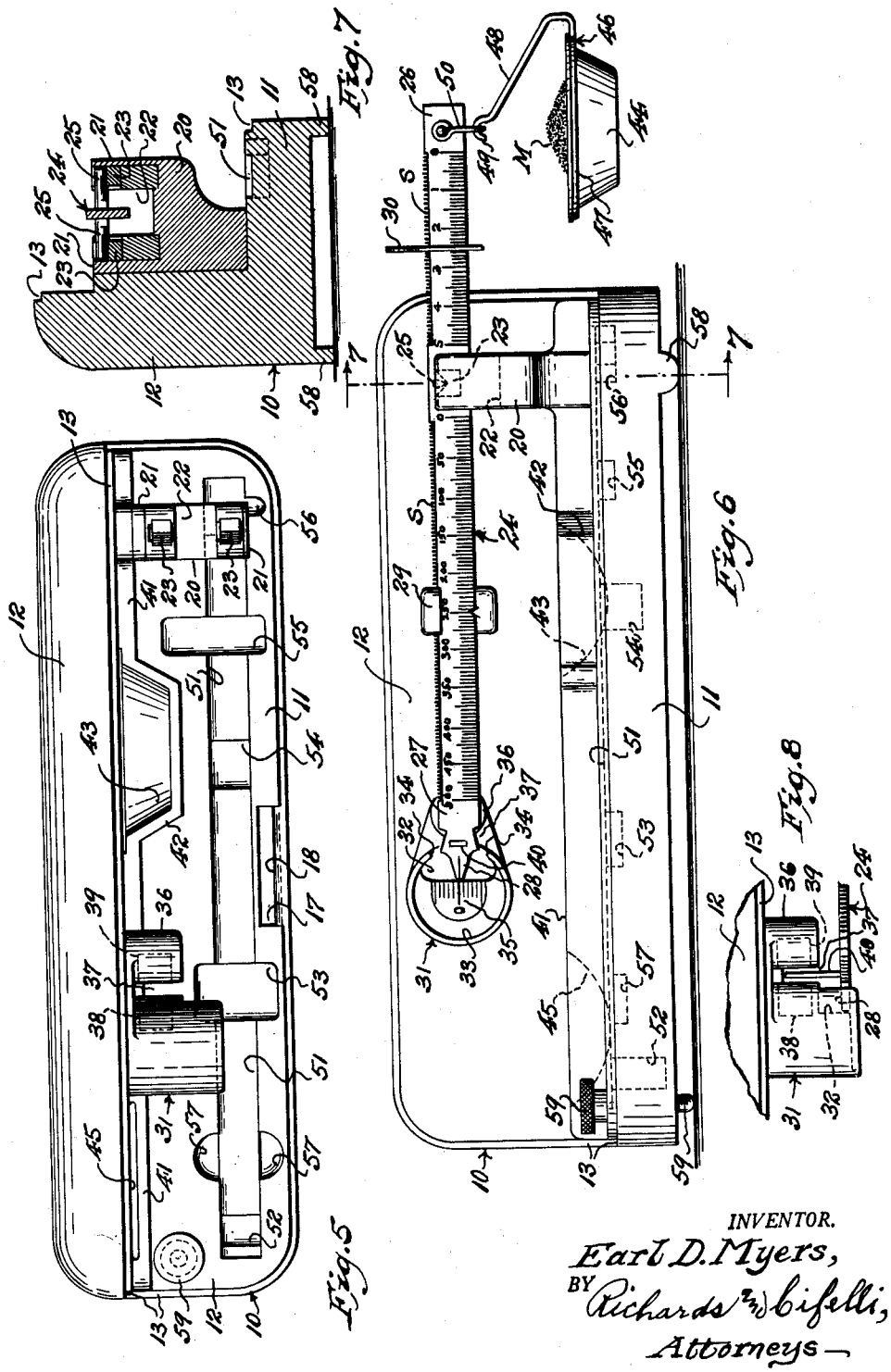
INVENTOR.
Earl D. Myers,
BY Richards & Cifelli,
Attorneys

United States Patent Office 3,082,833
Patented Mar. 26, 1963

3,082,833
TAKE-DOWN WEIGHING SCALE WITH PART STORAGE FACILITIES
Earl D. Myers, Scotch Plains, N.J., assignor to Ohaus Scale Corporation, Union, N.J., a corporation of New Jersey
Filed Dec. 19, 1960, Ser. No. 76,752
1 Claim. (Cl. 177—127)

This invention relates generally to weighing scales, and more particularly to improvements in scales adapted for use in determining, by weight, precision powder and bullet loads for hand loading of gun ammunition cartridges or shells, and for other uses with respect to which an accurate predetermined weight of material is desired to be obtained.

The invention has for an object to provide a weighing scale comprising a combined support and storage member or body for operative parts of the scale, certain of which parts can be dismounted from operative supported positions on the member or body, the latter having means to receive the dismounted parts for storage when the same are not in use, and said member or body having a removable cover for closing the same when the parts are so dismounted and stored.

Another object of the invention is to provide a novel construction of combined support and storage member or body for a weighing scale, the same having means to pivotally support a dismountable scale balance beam for operative use, scale beam balance indicating means to cooperate with the pivotally supported balance beam, and means to receive the dismounted balance beam and accessories, such as a load receiving pan and means to connect the same with the balance beam, for storage when not in use.

The invention has for a further object to provide magnetic means for dampening undue oscillation of the scale balance beam when in use.

The above and other objects of this invention will be understood from the following detailed description of the invention, when read with reference to the accompanying drawings showing an illustrative embodiment of the invention, in which drawings:

FIG. 1 is a front elevational view of the combined support and storage member or body in closed condition, with the dismountable scale balance beam and accessories stored therein; and FIG. 2 is an end elevational view of the same.

FIG. 3 is a front elevational view, on an enlarged scale, of the combined support and storage member or body in open condition with the cover removed, and with the dismounted scale balance beam and accessories in stored positions therein.

FIG. 4 is a fragmentary vertical cross-sectional view, taken on line 4—4 in FIG. 1, showing means for releasably securing the cover in closed relation to the combined support and storage member or body.

FIG. 5 is a top plan view of the open support and storage member or body, with the scale balance beam and accessories removed from their stored positions.

FIG. 6 is a front elevational view of the combined support and storage member or body with the scale balance beam supported thereby for operative use and equipped with accessories.

FIG. 7 is a transverse vertical sectional view, taken on line 7—7 in FIG. 6, showing the operative pivotal mounting of the scale balance beam on the support and storage member or body.

FIG. 8 is a fragmentary top plan view showing the scale beam balance indicating means and the magnetic means for dampening oscillation of the scale balance beam when in use.

Referring to the drawings, in which like reference characters denote corresponding parts, the reference character 10 indicates the combined support and storage member or body, the same comprising a bottom section 11 and a longitudinally extending back section 12 upstanding from said bottom section. Surrounding the top face margins of the bottom section 11 and the front face margins of the back section 12 are rabbets 13 to receive and seat the marginal portions of a hollow cover 14, which, when applied to the member or body 10, encloses the angular space intermediate said bottom section 11 and back section 12.

Suitable means is provided for detachably fastening the cover 14 in closed relation to the member or body 10. One form of such fastening means as shown (see FIGS. 1, 3 and 4) comprises an inwardly yieldable latching tongue 15, which is formed in connection with the front wall of the cover 14. The free end of this latching tongue depends beyond the bottom margin of said cover front wall, and terminates in an outwardly open female latching member 16. The bottom section 11 of the member or body 10 is provided with a countersunk socket or well 17 to receive said female latching member 16. Said socket or well is provided on its outer wall with an inwardly projecting male latching member or lip 18 to engage in the female latching member 16, when the cover 14 is disposed in closed relation to the member or body 10 (see FIG. 4). To release the cover 14 for removal from the member or body 10, the yieldable latching tongue 15 is manually pressed inward, thereby to disengage the female latching member 16 from the male latching member or lip 18, whereupon the cover can be lifted away and removed from the member or body 10 (see FIG. 3).

Suitably secured to the front face of the back wall section 12 adjacent to one end of the member or body 10, e.g. the right hand end as shown, is an upright bearing bracket 20 having a bifurcated top end provided by spaced apart arms 21 which bound an upwardly open intermediate space or notch 22. Mounted on the arms 21 within said space or notch 22, in opposition one to the other, are upwardly open V-shaped bearings 23 forming the fulcrum for pivoting the balance beam 24 of the weighing scale when operative.

The balance beam 24 is provided intermediate its ends with oppositely and laterally projecting pivot elements 25 of knife edge type, which, when engaged on the fulcruming bearings 23, pivot the balance beam for operative use. The pivot elements 25 divide the balance beam into a rearwardly extending load supporting arm 26 and a forwardly extending balanced weight indicating arm 27. Said indicating arm 27 terminates at its free end in an indicating pointer 28. Movable on the indicating arm 27 is a poise 29, which can be moved to a balanced load weight indicating position relative to a scale with which the indicating arm is provided, and which is suitably graduated to indicate suitable units of weight. The load supporting arm 26 may also be provided with a second poise 30, which can be moved to an indicating position thereon relative to a scale with which this arm 26 is provided which is suitably graduated to indicate fractions of the selected units of weight.

Also suitably secured to the front face of the back section 12 of the member or body 10, intermediate the bearing bracket 20 and the opposite end of said member or body, is a balance indicating member 31 for cooperation, with the indicating pointer 28 of the balance beam 24, when the latter is operative. The balance indicating member 31 is provided, at its outer end with a cup shaped open end including a recess 32 to accommodate said indicating pointer 28 of the balance beam. Said open end of the balance indicating member 31 is bounded by a peripheral wall 33 having ends 34 to serve as stops to limit the oscillatory movements of the balance beam 24, when it is in use. Within the open end of the balance indicating member 31 is disposed a balance indicating scale 35, graduated from a central balance indicating zero, relative to which the indicating pointer 28 of the balance beam is movable, when said beam is operative.

Associated with the balance beam indicating member 31 is another outwardly projecting member or post 36, disposed in spaced apart, side by side relation thereto, so as to provide an intermediate open gap 37. The members 31 and 36 are respectively provided with magnet elements 38 and 39 housed therein and opposed to said gap 37, and which produce a magnetic field across said gap. To the forward arm 27 of the balance beam 24 is affixed a laterally projecting armature blade 40, which, when the balance beam is operatively on the bearing bracket 20, projects into the gap 37 intermediate the magnets 38 and 39, so as to be influenced by the magnetic field, whereby to dampen undue oscillatory movement of the balance beam, when the latter is in use.

Formed in the angle between the top surface of the bottom section 11 of the member or body 10 and the front surface of the back section 12 thereof is a forwardly offset, longitudinal ledge or step 41, a suitably located portion of which, preferably between the bearing bracket 20 and the balance beam indicating member 31, is formed to provide projecting walls 42 to enclose a countersunk storage chamber 43, which is shaped to receive and support a load receiving pan 44 which is accessory to the scale, for storage when it is not in use (see FIG. 3). Countersunk in the ledge or step 41 is upwardly open storage cavity 45 for storing reception, when not in use, of a hanger frame 46 for the load receiving pan 44; this cavity being preferably located between the balance beam indicating member 31 and the adjacent end of the member or body 10 (see FIG. 3).

The hanger frame 46, which, in operative use of the scale, is adapted to suspend the load receiving pan 44 from the load supporting arm 26 of the operatively mounted balance beam 24, comprises an annular pan seating member 47 having a suspension arm 48 terminating in a coupling hook 49, the latter being detachably engageable with a suspension link or loop 50, which is pivotally connected with the free end portion of said load supporting arm 26 of the balance beam 24.

Countersunk in the top surface of the bottom section 11 of the member or body 10 is a longitudinally extending seating chamber 51 for the reception and storage of the balance beam 24, when the latter is dismounted from operative pivoted support upon the bearing bracket 20. This seating chamber includes a well or socket 52 to receive the armature blade 40 of the stored balance beam; a second suitably located well or socket 53 to receive the poise 29 of the stored balance beam; a third well or socket 54 to receive a pivot element 25 of the stored balance beam; a fourth suitably located well or socket 55 to receive the second poise 30 of the stored balance beam, when the latter is equipped with the same; and a fifth well or socket 56 to accommodate the suspension link or loop 50 of the stored balance beam. All said wells or sockets open into the bottom of said seating chamber 51 (see FIGS. 3, 5 and 6). Bordering sides of the seating chamber 51, adjacent an end thereof, are admission notches or indentations 57 to permit insertion of fingers to grasp the stored balance beam 24 for removal of the same from its stored deposit in the seating chamber, when use of the same is desired.

It will be obvious that when the balance beam 24 is removed from its fulcruming bearing bracket 20, and its accessories, viz. the load receiving pan 44 and hanger frame 46, are detached therefrom, these parts can be conveniently and securely stored within the member or body 10 (see FIG. 3), whereupon the cover 14 can be applied to and fastened to the latter (see FIGS. 1, 2 and 4) thus providing a compact and protective enclosure for said parts when the scale is not in use. The cover 14 is desirably provided with longitudinally spaced internal transverse partitions 14'. Said partitions are formed to provide downwardly extending leg portions 14" which, when the cover is applied to the member or body 10 in closing relation thereto, are adapted to abut the balance beam 24 as deposited in the storage chamber 51, thereby securing the former against displacement from the latter (see FIG. 4).

To prepare the scale for use, the cover 14 is removed from the member or body 10 whereupon the balance beam 24 is removed from the storage chamber 51, and pivotally mounted on the fulcruming bearing bracket 20, with its indicating pointer 28 operatively related to the balance indicating member 31. This having been done, the hanger frame 46 is removed from its stored position and hooked to the suspension link or loop 50 for suspension from the load supporting arm 26 of the balance beam, and the load receiving pan 44 is also removed from its stored position and mounted on said hanger frame (see FIG. 6). It will be noticed that, when the balance beam 24 with its accessories are so operatively mounted on the member or body 10, the load supporting arm 26 of the balance beam will project freely outward beyond an end of said member or body 10, so as to conveniently dispose the pan 44 for reception of material desired to be weighed. The desired weight of material to be obtained is determined by moving the poise 29, or both this poise and the poise 30, to desired weight indication provided by the graduated scale or scales of the balance beam, whereupon material M is delivered into the pan 44 until the balance beam is brought to balance.

It will be understood that the member or body 10, when the scale is in use, should be supported in a level condition. To assure attainment of such level condition, the bottom section 11 of the member or body 10 is provided adjacent one end thereof with supporting feet 58, and adjacent to the opposite end with a manipulatable leveling screw 59, all in manner known to the art.

Although within the broad aspects of this invention, the weighing scale can be adapted for many specific uses, and the scale or scales of the balance beam can be graduated to denote selected units of weight suitable for such uses. The illustrative embodiment of the weighing scale, as shown in the drawings, is one adapted to determine, by weight, precision powder or bullet loads for hand loading of gun ammunition. For such use the scale of the indicating arm 27 of the balance beam 24 is graduated to denote grain units of weight, and the scale of the load supporting arm 26 thereof is graduated to denote fractions of such units, e.g. tenths of grain units. Each arm 27 and 26 is preferably, but not necessarily, provided along top edges thereof with serrations S corresponding to the scale graduations, and engageable by the movable poises.

Having now described my invention, I claim:

A weighing scale comprising a one-piece body member formed by a horizontal bottom section and a back section upstanding from the rear marginal portion thereof and integral therewith, said sections defining an open compartment in the angular space therebetween, a removable hollow cover engageable with said body member to enclose said compartment, said body member and cover having cooperative means to releasably secure the cover in closed relation to said body member, a balance beam, means affixed to the inner face of the back section to pivotally support the balance beam for use, a balance indicating member also affixed to the inner face of the back section for cooperation with the balance beam when the latter is in use, said balance beam being detachable from the supporting means, the bottom section of the body member having an upwardly open countersunk seating chamber to receive the balance beam for storage within the body member when said beam is removed from the supporting means and said compartment is closed by the cover, accessory means detachable from the balance beam, said accessory means, when attached to the beam for use, being adapted to receive material desired to be weighed, and means provided in connection with the inner face of the back section of the body member to receive said accessory means for storage within the body member compartment when detached from the balance beam and said compartment is closed by the cover, wherein the free marginal edge portions of the bottom and back sections of the body member are provided with rabbets forming shoulders to seat marginal portions of the cover.

References Cited in the file of this patent
UNITED STATES PATENTS

| | | |
|---|---|---|
| 676,706 | Trantom | June 14, 1901 |
| 997,091 | Reichmann | July 4, 1911 |
| 1,428,165 | Hausmann | Sept. 5, 1922 |
| 1,628,205 | Weber | May 10, 1927 |
| 1,804,177 | Muller | May 5, 1931 |
| 2,187,356 | Malek | Jan. 16, 1940 |
| 2,200,504 | Powell | Nov. 5, 1940 |
| 2,332,861 | Langsner | Oct. 26, 1943 |